(12) United States Patent
Iwata et al.

(10) Patent No.: US 11,878,742 B2
(45) Date of Patent: Jan. 23, 2024

(54) UTILITY VEHICLE

(71) Applicant: KAWASAKI MOTORS, LTD., Akashi (JP)

(72) Inventors: Tetsuya Iwata, Kakogawa (JP); Yusuke Nakashima, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 397 days.

(21) Appl. No.: 17/225,379

(22) Filed: Apr. 8, 2021

(65) Prior Publication Data

US 2021/0331750 A1 Oct. 28, 2021

Related U.S. Application Data

(60) Provisional application No. 63/013,936, filed on Apr. 22, 2020.

(51) Int. Cl.
*B62D 21/18* (2006.01)
*B62D 33/027* (2006.01)

(52) U.S. Cl.
CPC ....... *B62D 33/0273* (2013.01); *B62D 21/183* (2013.01)

(58) Field of Classification Search
CPC .... B62D 21/183; B62D 33/0273; B60Q 1/02; B60Q 1/24; B60Q 1/26; B60Q 1/2619; B60Q 1/2623; B60Q 1/2626; B60Q 1/2661; B60Q 1/30; B60Q 1/2607; B60Q 1/2615; B60Q 1/2638; B60Q 1/2642; B60Q 2900/10; F21S 43/195; F21S 43/51; F21S 45/10

See application file for complete search history.

(56) References Cited

U.S. PATENT DOCUMENTS

| 9,512,809 | B2 | 12/2016 | Tsumiyama et al. |
| 10,969,079 | B1 * | 4/2021 | Dearing ................ F21S 43/195 |
| 2006/0202500 | A1 * | 9/2006 | Eschebach ......... B62D 33/0273 |
| | | | 296/57.1 |
| 2009/0115222 | A1 * | 5/2009 | Hohnl ...................... B60R 5/04 |
| | | | 296/183.1 |

(Continued)

FOREIGN PATENT DOCUMENTS

| DE | 102008012161 A1 * | 9/2009 | ........... B60Q 1/0441 |
| FR | 2904096 A1 * | 1/2008 | ........... B60Q 1/0005 |

OTHER PUBLICATIONS

Schindler, Fastening Arrangement For Lamp on Motor Vehicle, Has Lamp Housing, Where Housing Has Corresponding Lug With Boundary Area at Insertion Opening, and Holding Element is Designed to Extend Behind Head, Sep. 3, 2009, EPO, DE 102008012161 A1, Machine Translation of Description (Year: 2009).*

*Primary Examiner* — Paul N Dickson
*Assistant Examiner* — Matthew D Lee
(74) *Attorney, Agent, or Firm* — Alleman Hall Creasman & Tuttle LLP

(57) ABSTRACT

A utility vehicle includes a vehicle body frame and a cargo bed supported by the vehicle body frame, the cargo bed including a side wall unit. The side wall unit includes a side wall, a tail lamp mounted on a rear end portion of the side wall, and a bolt including a shaft portion and a head portion. The tail lamp is secured to the side wall by the bolt oriented in a vehicle width direction. The head portion of the bolt is hidden by a part of the side wall unit when viewed from behind.

8 Claims, 7 Drawing Sheets

(56) References Cited

U.S. PATENT DOCUMENTS

| | | | |
|---|---|---|---|
| 2010/0067246 A1* | 3/2010 | Skiba | B60Q 1/2626 |
| | | | 362/487 |
| 2015/0009697 A1* | 1/2015 | Kawamura | F21S 43/14 |
| | | | 362/516 |
| 2017/0136942 A1* | 5/2017 | Wu | B60Q 1/2607 |
| 2017/0268741 A1* | 9/2017 | Happy | F21S 43/195 |
| 2020/0217478 A1* | 7/2020 | Marchlewski | B60Q 1/2623 |
| 2021/0300236 A1* | 9/2021 | Aquilina | B60Q 1/2626 |
| 2022/0111787 A1* | 4/2022 | Pencak | B62D 33/0273 |

\* cited by examiner

UTILITY VEHICLE

CROSS REFERENCE TO RELATED APPLICATIONS

This application claims priority to U.S. Provisional Patent Application Ser. No. 63/013,936, filed Apr. 22, 2020, the entirety of which is hereby incorporated herein by reference for all purposes.

BACKGROUND OF THE INVENTION

Technical Field

The present disclosure relates to a utility vehicle adapted to travel on rough terrain.

Description of the Related Art

U.S. Pat. No. 9,512,809 discloses a utility vehicle adapted to travel on rough terrain. The tail lamps of such a utility vehicle are preferably mounted on a rear end portion of the cargo bed of the vehicle in order, for example, to increase the visibility of the lamps, although in some cases they are mounted on a rear end portion of the vehicle body and located below the cargo bed. In particular, since the rear wall of the cargo bed is configured to be opened and closed, the tail lamps are preferably mounted on rear end portions of the side walls of the cargo bed in view of wiring and other factors.

However, when the tail lamp is secured to the rear edge surface of the side wall of the cargo bed by means of a bolt inserted from behind, the head portion of the bolt is exposed to the environment behind the vehicle, and the exposed head portion of the bolt has the risk of contact by an external object and spoils the appearance of the vehicle.

SUMMARY OF THE INVENTION

A utility vehicle according to one aspect of the present disclosure includes a vehicle body frame and a cargo bed supported by the vehicle body frame, the cargo bed including a side wall unit. The side wall unit includes a side wall, a tail lamp mounted on a rear end portion of the side wall, and a bolt including a shaft portion and a head portion. The tail lamp is secured to the side wall by the bolt oriented in a vehicle width direction. The head portion of the bolt is hidden by a part of the side wall unit when viewed from behind.

In the above configuration, the bolt is inserted in the vehicle width direction to secure the tail lamp to the side wall, and the head portion of the bolt is hidden by the side wall unit when viewed from behind. Thus, the bolt is not visible from behind. This ensures protection of the bolt and allows for improved appearance of the vehicle.

The above and further objects, features and advantages of the present disclosure will be more apparent from the following detailed description of preferred embodiments with reference to the accompanying drawings.

DETAILED DESCRIPTION OF THE EMBODIMENTS

Hereinafter, exemplary embodiments will be described with reference to the drawings.

Embodiment 1

Figure 1:
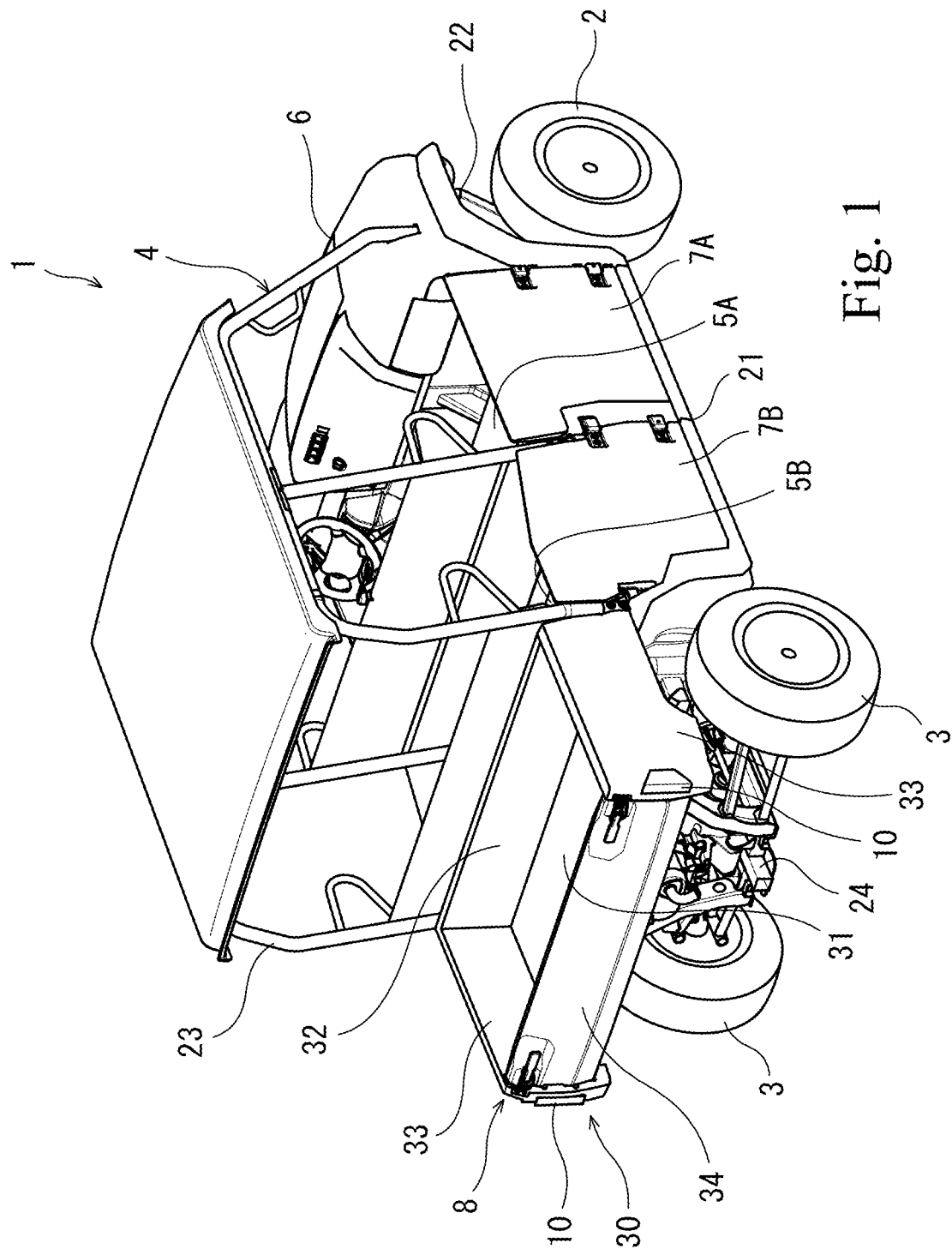
FIG. 1 is a right rear perspective view of a utility vehicle according to Embodiment 1.

FIG. 1 is a right rear perspective view of a utility vehicle 1 according to Embodiment 1. As shown in FIG. 1, the utility vehicle 1 includes a pair of left and right front wheels 2 and a pair of left and right rear wheels 3. The front and rear wheels 2 and 3 support the vehicle body frame 4. Balloon tires are used in the front and rear wheels 2 and 3. The vehicle body frame 4 is a pipe frame constructed of a plurality of pipes connected together.

The vehicle body frame 4 includes a base frame portion 21, a front frame portion 22, a cabin frame portion 23, and a rear frame portion 24. The base frame portion 21 supports front seats 5A (driver seat and passenger seat) and rear seats 5B. The occupant seats need not be arranged in two rows but may be arranged in a single row. The front frame portion 22 extends forward from the base frame portion 21 and supports the front wheels 2. The cabin frame portion 23 projects upward from the base frame portion 21 and is formed to surround the occupant space in which the front and rear seats 5A and 5B are disposed. The occupant space surrounded by the cabin frame portion 23 is exposed to the outside environment. The rear frame portion 24 extends rearward from the base frame portion 21 and is located behind the cabin frame portion.

A hood 6 made of resin is disposed ahead of the cabin frame portion 23. The hood 6 is supported by the front frame portion 22 and openably mounted to cover the space between the left and right front wheels 2 from above. Below the cabin frame portion 23 are located front side doors 7A and rear side doors 7B.

A cargo bed 8 supported by the rear frame portion 24 is disposed behind the cabin frame portion 23. The cargo bed 8 is an assembly of wall main bodies made of resin and frames made of metal. The cargo bed 8 includes a bottom wall 31, a front wall 32, a pair of side walls 33, and a rear wall 34. The rear wall 34 is configured to be angularly movable between a normal position in which the rear wall 34 rises vertically and an open position in which the rear wall 34 lies horizontally. That is, the rear wall 34 is angularly movable about a rotational axis located at or in the vicinity of the lower edge of the rear wall 34 and extending in the left-right direction, and the angular movement is such that the upper edge of the rear wall 34 moves rearward and downward in an arc.

A pair of tail lamps 10 are respectively mounted on rear end portions of the pair of side walls 33. The tail lamps 10 are configured to be lit in response to the operation of the brakes. The tail lamps 10 are mounted on the side walls 33 in such a manner as to be visible from the side and behind.

Figure 2:
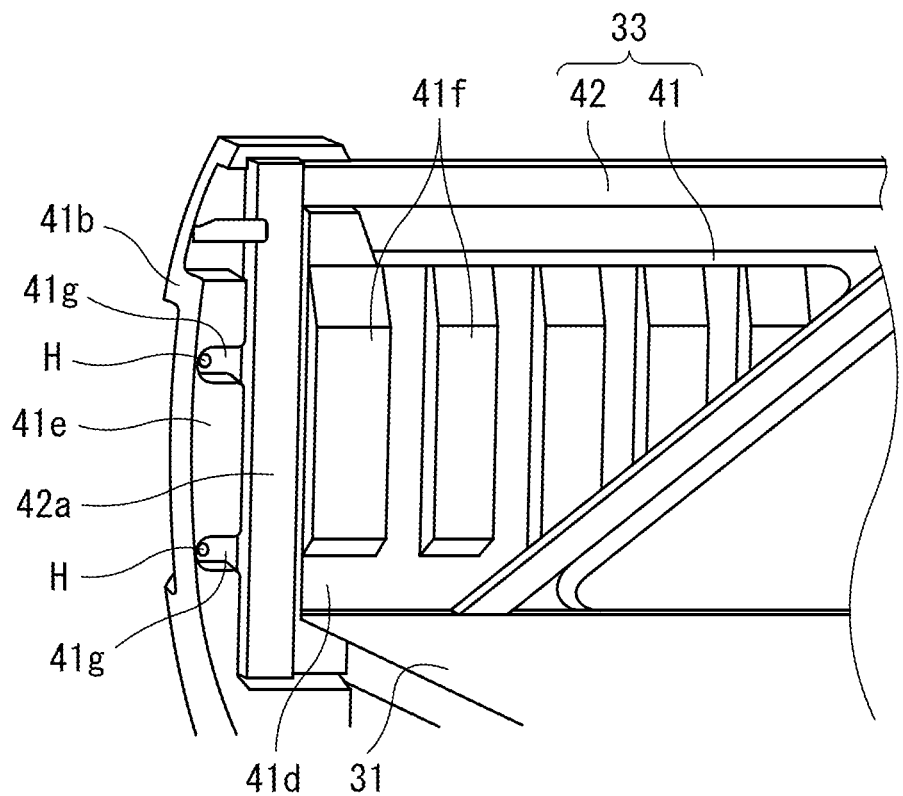
FIG. 2 is a perspective view of a side wall of a cargo bed illustrated in FIG. 1 and shows the side wall as viewed from inside in the vehicle width direction.
Figure 3:
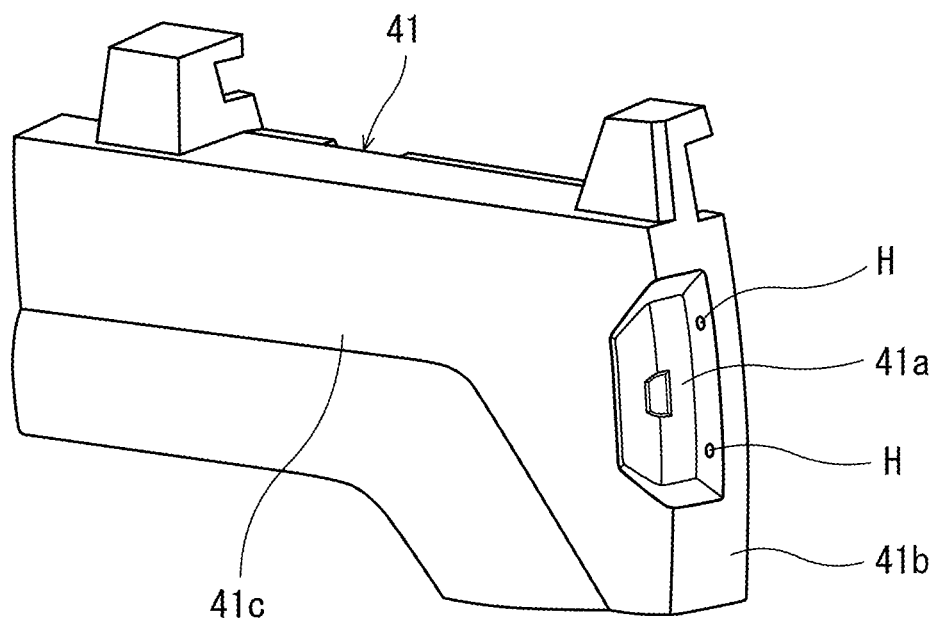
FIG. 3 is a perspective view of a side wall main body of the side wall of FIG. 2 and shows the side wall main body as viewed from outside in the vehicle width direction.
Figure 4:
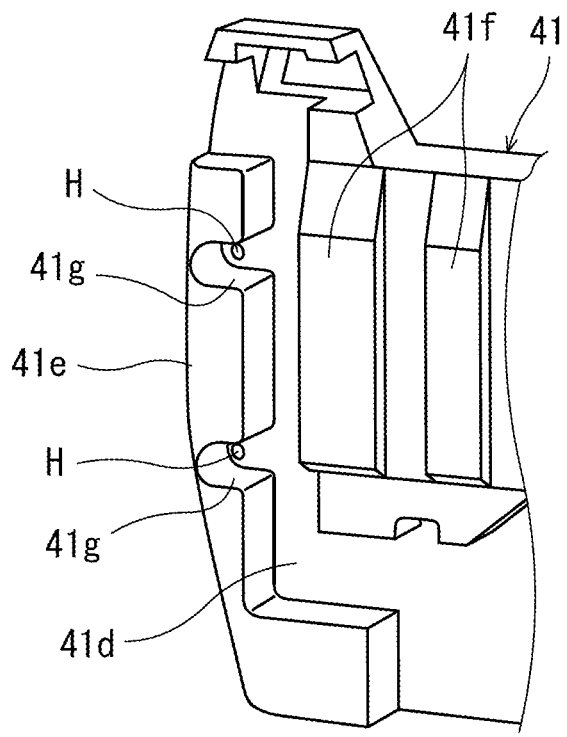
FIG. 4 is a perspective view of the side wall main body of the side wall of FIG. 2 and shows the side wall main body as viewed from inside in the vehicle width direction.

FIG. 2 is a perspective view of the side wall 33 of the cargo bed 8 illustrated in FIG. 1 and shows the side wall 33 as viewed from inside in the vehicle width direction. FIG. 3 is a perspective view of a side wall main body 41 of the side wall 33 of FIG. 2 and shows the side wall main body 41 as viewed from outside in the vehicle width direction. FIG. 4 is a perspective view of the side wall main body 41 of the side wall 33 of FIG. 2 and shows the side wall main body 41 as viewed from inside in the vehicle width direction. As shown in FIG. 2, the side wall 33 includes the side wall main body 41 made of resin and a side wall frame 42 made of metal and reinforcing the side wall main body 41. The side wall main body 41 is hollow. The side wall main body 41 is formed by blow molding. The side wall frame 42 is a pipe with a rectangular cross-section. The side wall frame 42 includes a rear post portion located at a rear end portion of the side wall main body 41 and extending in the vertical direction.

As shown in FIG. 3, the side wall main body 41 includes an accommodation portion 41a for accommodating the tail lamp 10. The accommodation portion 41a is recessed from a rear edge surface 41b to an outer side surface 41c of the side wall main body 41. As shown in FIGS. 3 and 4, the side wall main body 41 is provided with bolt holes H for securing the tail lamp 10 to the side wall main body 41. The bolt holes H extend from an inner side surface 41d to the accommodation portion 41a of the side wall main body 41.

As shown in FIGS. 2 and 4, the side wall main body 41 includes a plurality of rib portions 41e and 41f projecting inward from the inner side surface 41d in the vehicle width direction. The rib portion 41e is located in a rearmost region of the side wall main body 41 and extends along the rear edge surface 41b of the side wall main body 41 in the vertical direction. The rib portion 41e is hollow and is substantially U-shaped in horizontal cross-section. The rear post portion 42a of the side wall frame 42 is located ahead of the rib portion 41e and extends along the rib portion 41e in the vertical direction. The rib portions 41f are located ahead of the rear post portion 42a and extend in the vertical direction. The rib portion 41e, which is the rearmost rib portion, extends downward beyond the lower ends of the other rib portions 41f. The length over which the rib portion 41e projects inward in the vehicle width direction is smaller than the length over which the rib portions 41f project inward in the vehicle width direction.

In the rib portion 41e there are formed groove portions 41g provided with the bolt holes H. Specifically, each bolt hole H is at the bottom surface of a corresponding one of the groove portions 41g as viewed from inside in the vehicle width direction (the "bottom surface" refers to the surface that faces inward in the vehicle width direction). The groove portions 41g open forward and inward in the vehicle width direction and are substantially C-shaped when viewed from inside in the vehicle width direction. Thus, a part of the rib portion 41e is located behind the bolt holes H. The substantially C-shaped groove portions 41g are covered from the front by the rear post portion 42a of the side wall frame 42. Thus, the groove portions 41g and the rear post portion 42a constitute a recessed portion 30a recessed outward in the vehicle width direction from the surface of the side wall unit 30 that faces inward in the vehicle width direction, and define a recessed space S opening inward in the vehicle width direction. The groove portions 41g may be substantially circular when viewed from inside in the vehicle width direction.

Figure 5:
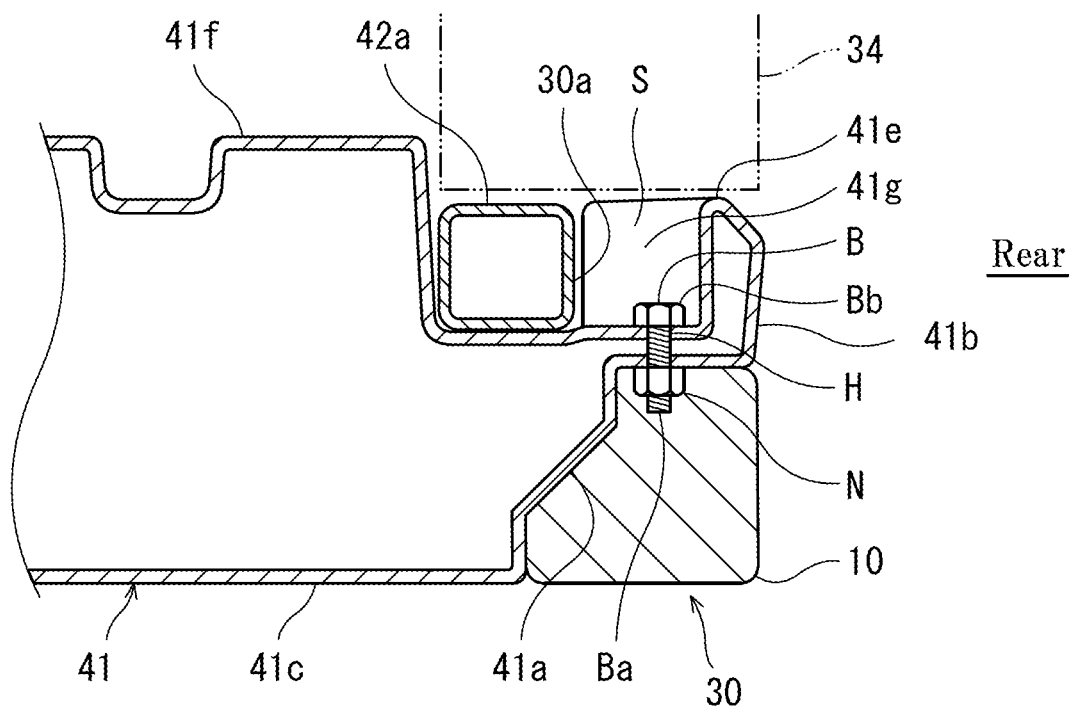
FIG. 5 is a horizontal cross-sectional view of a side wall unit with a tail lamp mounted on the side wall of FIG. 2.

FIG. 5 is a horizontal cross-sectional view of the side wall unit 30 with the tail lamp 10 mounted on the side wall 33 of FIG. 2. As shown in FIG. 5, the tail lamp 10 has an inner surface facing inward in the vehicle width direction, and this inner surface is provided with nuts N (e.g., insert nuts). Specifically, the nuts N are located inside the housing of the tail lamp 10, and the female threads of the nuts N are exposed to the outside of the housing through holes of the housing. The accommodation portion 41a of the side wall main body 41 is shaped to allow the axes of the nuts N to coincide with the axes of the bolt holes H when the tail lamp 10 is accommodated in the accommodation portion 41a. The tail lamp 10 is secured to the side wall main body 41 by bolts B. Each bolt B includes a shaft portion Ba provided with a male thread and a head portion Bb located at an end of the shaft portion Ba. The shaft portions Ba of the bolts B are inserted into the bolt holes H from inside in the vehicle width direction and threaded into the nuts N of the tail lamp 10 accommodated in the accommodation portion 41a.

The head portions Bb of the bolts B threaded into the nuts N are hidden by the rib portion 41e when viewed from behind. Specifically, the head portion Bb of each bolt B is surrounded by the inner peripheral surface of the groove portion 41g and the rear surface of the rear post portion 42a. The surface of the rib 41e that faces inward in the vehicle width direction is substantially flush with the surface of the rear post portion 42a that faces inward in the vehicle width direction. Alternatively, the inwardly facing surface of the rib 41e may be inward of the inwardly facing surface of the rear post portion 42a in the vehicle width direction. Further, the head portions Bb of the bolts B are hidden by the side edge surface of the rear wall 34 from inside in the vehicle width direction when the rear wall 34 is in the normal position. That is, the side edge surface of the rear wall 34 in the normal position covers the groove portions 41g from inside in the vehicle width direction, and the space in which the head portions Bb of the bolts B are situated is surrounded on all sides by the inner peripheral surfaces of the groove portions 41g, the rear surface of the rear post portion 42a, and the side edge surface of the rear wall 34.

In the configuration described above, where the bolts B are inserted into the bolt holes H from inside in the vehicle width direction and threaded into the nuts N of the tail lamp 10, the bolts B are not visible from outside in the vehicle width direction. Additionally, the bolts B are not visible from behind either since the rib portion 41e of the side wall 33 hides the head portions Bb of the bolts B as viewed from behind. This ensures protection of the bolts B and allows for improved appearance of the vehicle.

Additionally, since the rib portion 41e includes the groove portions 41g provided with the bolt holes H, the side wall main body 41 made of resin can be effectively reinforced by the rib portion 41e, and the side wall 33 can be made more compact in the front-rear direction than when the entire rib portion 41e is located at a different location than the bolt holes H.

Additionally, since the groove portions 41g open forward and inward in the vehicle width direction and are substantially C-shaped when viewed from inside in the vehicle width direction, the groove portions 41g can be made larger in size so that the insertion and removal of the bolts B are easier than when the groove portions as viewed from inside in the vehicle width direction are circular.

Additionally, since the groove portions 41g of the side wall main body 41 are covered from the front by the rear post portion 42a of the side wall frame 42, the head portions Bb of the bolts B can be effectively protected by the combination of the side wall main body 41 made of resin and the side wall frame 42 made of metal.

Additionally, since the side wall main body 41 is formed by blow molding, the cargo bed 8 can be produced inexpensively and easily. Further, the configuration described above renders it possible to produce the side wall main body 41 by blow molding without the use of a complicated mold.

Additionally, since the head portions Bb of the bolts B are hidden by the side edge surface of the rear wall 34 from inside in the vehicle width direction when the rear wall 34 is in the normal position, the bolts B can be protected also from inside in the vehicle width direction, and the appearance as viewed from inside in the vehicle width direction can also be improved.

Embodiment 2

Figure 6:
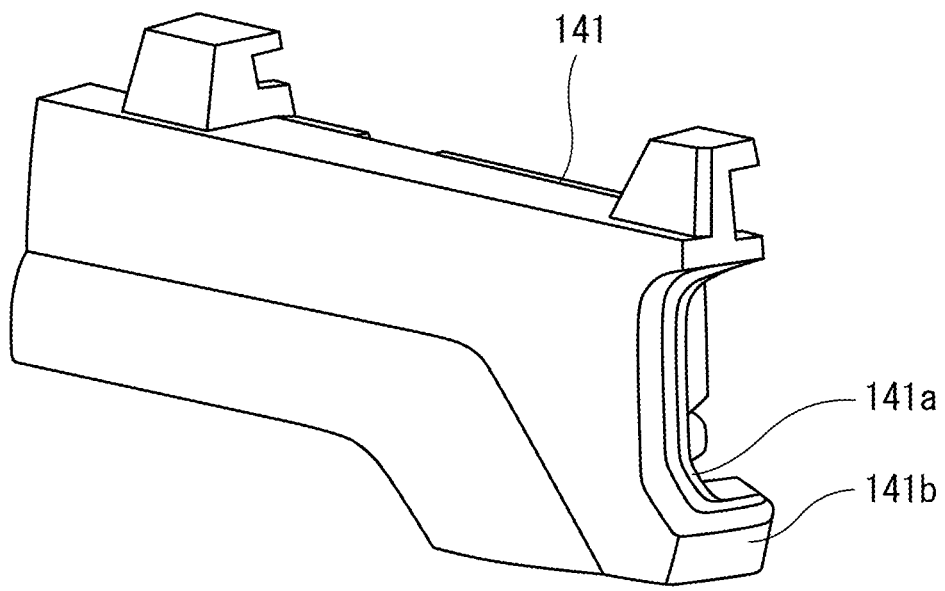
FIG. 6 is a perspective view of a side wall main body of a side wall of a cargo bed of a utility vehicle according to Embodiment 2 and shows the side wall main body as viewed from outside in the vehicle width direction.
Figure 7:
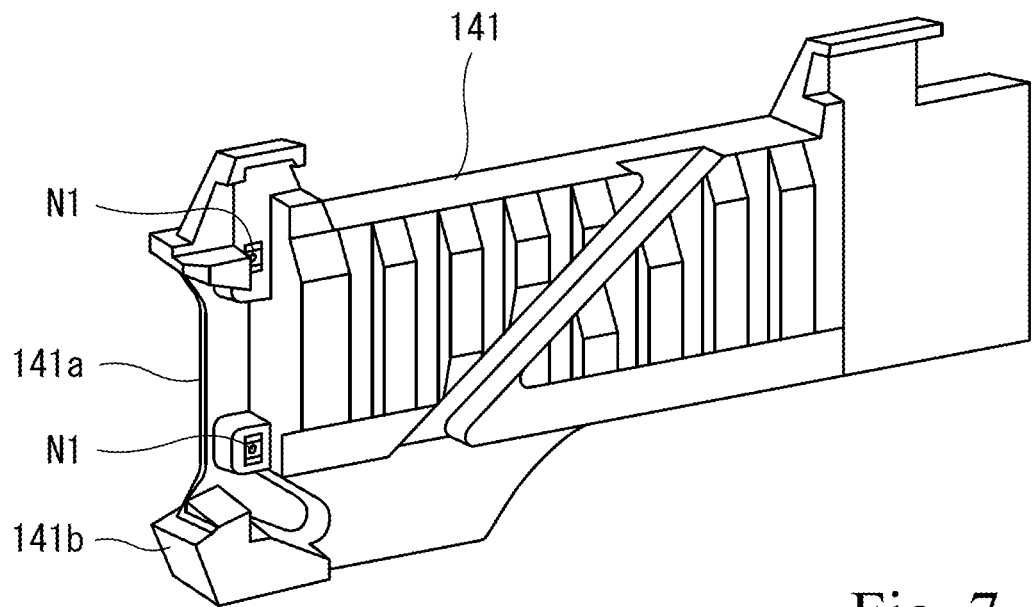
FIG. 7 is a perspective view of the side wall main body of FIG. 6 as viewed from inside in the vehicle width direction.

FIG. 6 is a perspective view of a side wall main body 141 of a side wall of a cargo bed of a utility vehicle according to Embodiment 2 and shows the side wall main body 141 as viewed from outside in the vehicle width direction. FIG. 7 is a perspective view of the side wall main body 141 of FIG. 6 as viewed from inside in the vehicle width direction. As shown in FIGS. 6 and 7, the side wall main body 141 includes a cut portion 141a for accommodating a tail lamp 110. The cut portion 141a is formed by cutting a rear end 141b of the side wall main body 141 in the forward direction and is open on both sides in the vehicle width direction. Nuts N1 facing inward in the vehicle width direction are formed as inserts in a surface of the rear end portion of the side wall main body 141, and the surface is one which faces inward in the vehicle width direction.

Figure 8:
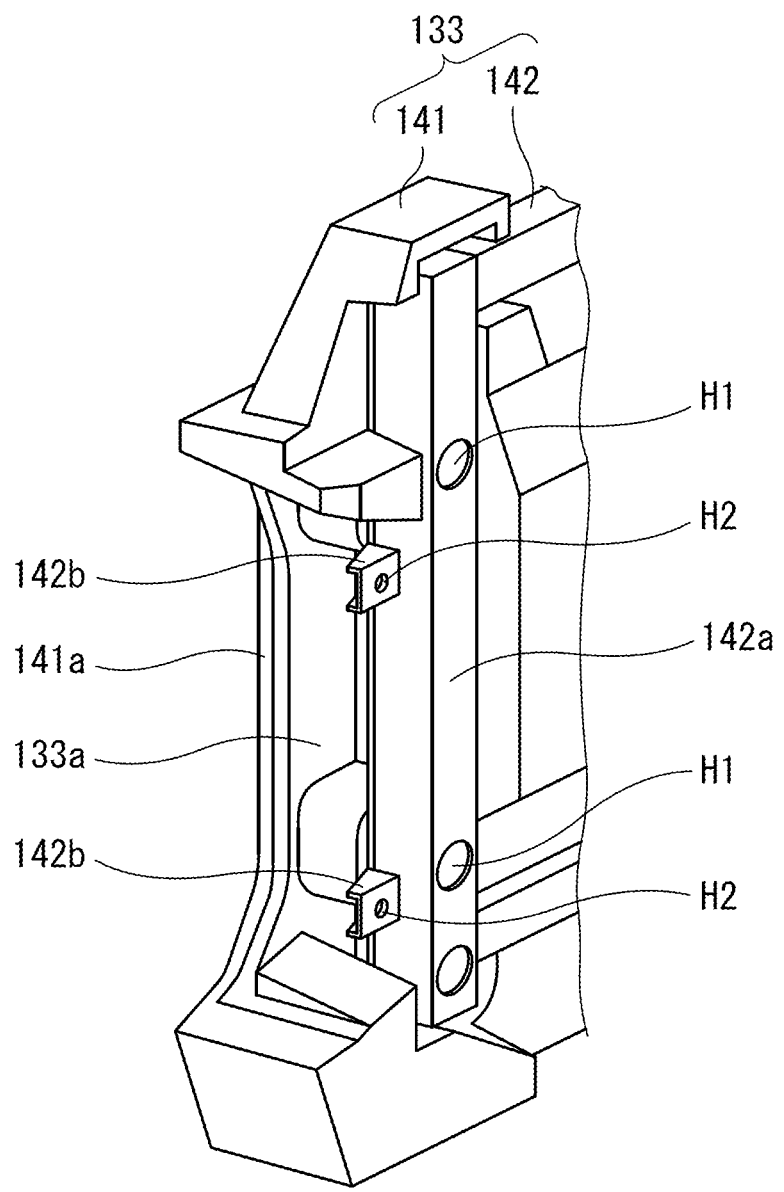
FIG. 8 is a perspective view of key parts of a side wall with a side wall frame mounted on the side wall main body of FIG. 7.

FIG. 8 is a perspective view of key parts of a side wall 133 with a side wall frame 142 mounted on the side wall main body 141 of FIG. 7. As shown in FIG. 8, the side wall frame 142 includes a rear post portion 142a extending in the vertical direction, and the rear post portion 142a is secured to the side wall main body 141 from inside in the vehicle width direction. The rear post portion 142a is a rectangular pipe including a plate portion facing inward in the vehicle width direction, and the inwardly facing plate portion is provided with openings H1 aligned with the nuts N1. The plate portion of the rear post portion 142a that faces outward in the vehicle width direction is provided with bolt holes (not shown) communicating with the nuts N1 (see FIG. 7). Bolts B1 (see FIG. 11) are threaded into the nuts N1 from inside in the vehicle width direction through the openings H1, thus securing the rear post portion 142a to the side wall main body 141. The head portions B1b of the bolts B1 are enclosed in the internal space of the rear post portion 142a.

The rear post portion 142a is contiguous to the cut portion 141a. That is, the rear surface of the rear post portion 142a forms the bottom surface (front surface) of a tail lamp accommodation portion 133a together with the cut portion 141a. To the rear post portion 142a are secured brackets 142b, which project rearward from the rear post portion 142a. The brackets 142b are located in the tail lamp accommodation portion 133a. The brackets 142b are outward of the surface of the rear post portion 142a that faces inward in the vehicle width direction. Each bracket 142b is provided with a bolt hole H2 facing in the vehicle width direction. Nuts N2 are secured to the surfaces of the brackets 142b that face outward in the vehicle width direction, and are in communication with the bolt holes H2.

Figure 9:
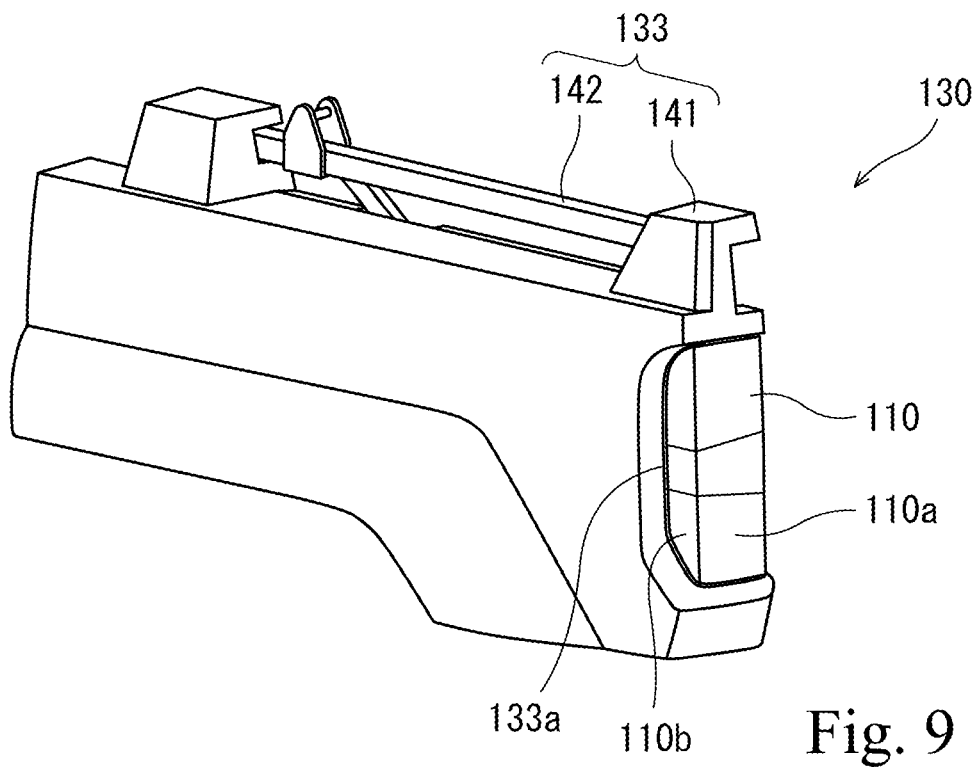
FIG. 9 is a perspective view of a side wall unit with a tail lamp mounted on the side wall of FIG. 8 and shows the side wall unit as viewed from outside in the vehicle width direction.
Figure 10:
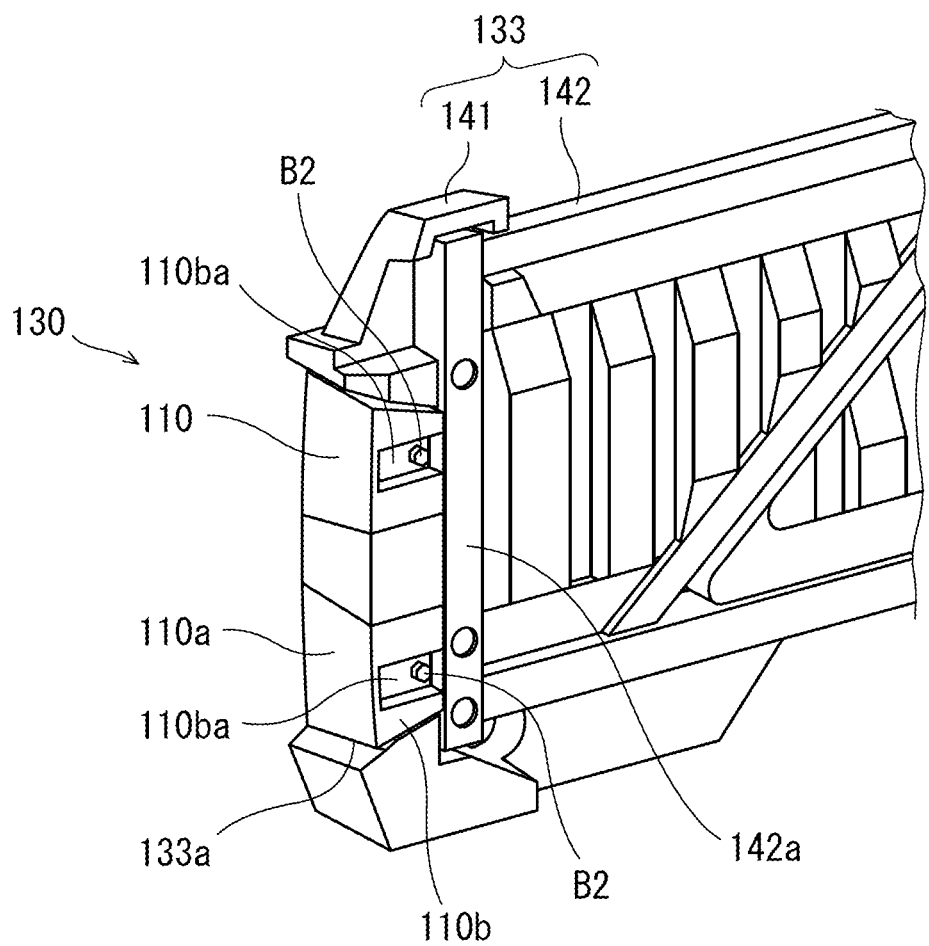
FIG. 10 is a perspective view of the side wall unit of FIG. 9 as viewed from inside in the vehicle width direction.
Figure 11:
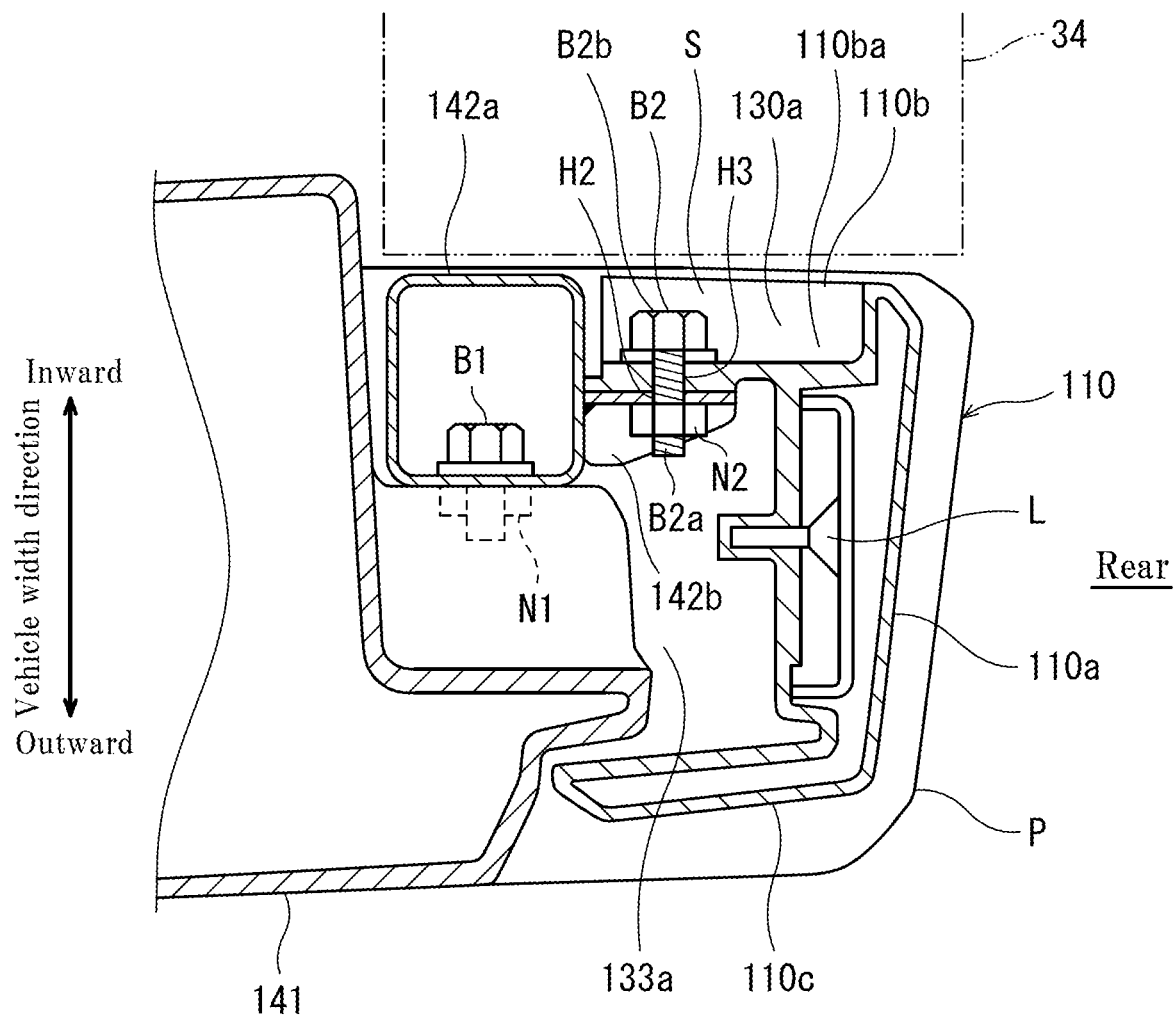
FIG. 11 is a horizontal cross-sectional view of the side wall unit of FIG. 10.

FIG. 9 is a perspective view of a side wall unit 130 with the tail lamp 110 mounted on the side wall 133 of FIG. 8 and shows the side wall unit 130 as viewed from outside in the vehicle width direction. FIG. 10 is a perspective view of the side wall unit 130 of FIG. 9 as viewed from inside in the vehicle width direction. FIG. 11 is a horizontal cross-sectional view of the side wall unit 130 of FIG. 10. As shown in FIGS. 9 to 11, the tail lamp 110 is disposed in the tail lamp accommodation portion 133a of the side wall 133. In plan view, the entire tail lamp 110 is inside the profile P of the side wall 133. The tail lamp 110 includes a rear portion 110a, an inner portion 110b, and an outer portion 110c.

The rear portion 110a has an internal space enclosing a light source (such as an LED) and is configured to emit light rearward. The inner portion 110b projects forward from an inner region of the rear portion 110a that is inward of the center of the rear portion 110a in the vehicle width direction. The inner portion 110b has no internal space communicating with the internal space of the rear portion 110a. The outer portion 110c projects forward from an outer region of the rear portion 110a that is outward of the center of the rear portion 110a in the vehicle width direction. The outer portion 110c has an internal space communicating with the internal space of the rear portion 110a and is configured to emit light outward in the vehicle width direction.

The inner portion 110b of the tail lamp 110 has a surface facing inward in the vehicle width direction, and this inwardly facing surface includes groove portions 110ba recessed outward in the vehicle width direction. The groove portions 110ba open forward and inward in the vehicle width direction. The groove portions 110ba are placed on the brackets 142b from inside in the vehicle width direction. The bottom (the part placed on the bracket 142b) of each groove portion 110ba has a bolt hole H3 coinciding with the bolt hole H2 of the bracket 142b. The groove portions 110ba are covered from the front by the rear post portion 142a. That is, the rear post portion 142a closes the front openings of the groove portions 110ba. Thus, the groove portions 110ba and the rear post portion 142a constitute a recessed portion 130a recessed outward in the vehicle width direction from the surface of the side wall unit 130 that faces inward in the vehicle width direction, and define a recessed space S opening inward in the vehicle width direction.

Shaft portions B2a of bolts B2 are inserted into the bolt holes H3 of the groove portions 110ba and the bolt holes H2 of the brackets 142b and threaded into the nuts N2. The head portions B2b of the bolts B2 securing the groove portions 110ba to the brackets 142b are enclosed in the recessed space S. Thus, the head portions B2b of the bolts B2 are hidden by the tail lamp 110 when viewed from behind. Specifically, the head portions B2b of the bolts B2 are surrounded by the recessed portion 130a formed by the inner peripheral surfaces of the groove portions 110ba and the rear surface of the rear post portion 142a.

Further, the head portions B2b of the bolts B2 are hidden by the side edge surface of the rear wall 34 from inside in the vehicle width direction when the rear wall 34 is in the normal position. That is, the side edge surface of the rear wall 34 in the normal position covers the recessed portion 130a from inside in the vehicle width direction, and the space in which the head portions B2b of the bolts B2 are situated is surrounded on all sides by the inner peripheral surfaces of the groove portions 110ba, the rear surface of the rear post portion 142a, and the side edge surface of the rear wall 34.

In the configuration described above, the tail lamp 110 hides the head portions B2b of the bolts B2 as viewed from behind, and thus the bolts B2 are not visible from behind. This ensures protection of the bolts B2 and allows for improved appearance of the vehicle. The groove portions 110ba may be formed by a combination of the tail lamp 110 and the side wall main body 141 rather than by the tail lamp 110 alone. The other features of Embodiment 2 are the same as those of Embodiment 1 previously described and will not be described again.

Many modifications and other embodiments of the present disclosure will be apparent to those skilled in the art from the foregoing description. Accordingly, the foregoing description is to be construed as illustrative only, and is provided for the purpose of presenting those skilled in the art with the best mode for implementing the teaching of the present disclosure. The details of the structure and/or function may be varied substantially without departing from the scope of the present disclosure.

What is claimed is:

1. A utility vehicle comprising:
   a vehicle body frame; and
   a cargo bed supported by the vehicle body frame, the cargo bed including a side wall unit,
   wherein the side wall unit includes a side wall, a tail lamp mounted on a rear end portion of the side wall, and a bolt including a shaft portion and a head portion,
   wherein the tail lamp is secured to the side wall by the bolt oriented in a vehicle width direction,
   wherein the head portion of the bolt is hidden by a part of the side wall unit in a rear view of the vehicle,
   wherein the side wall unit includes a recessed portion recessed in the vehicle width direction to define a recessed space opening in the vehicle width direction, and
   wherein the head portion of the bolt is enclosed in the recessed space.

2. The utility vehicle according to claim 1,
   wherein the cargo bed includes a rear wall,
   wherein the rear wall of the cargo bed is configured to be movable between a normal position and an open position, and
   wherein the head portion of the bolt is hidden by a side edge surface of the rear wall from inside in the vehicle width direction when the rear wall is in the normal position.

3. The utility vehicle according to claim 1,
   wherein the side wall includes a side wall main body made of resin and a side wall frame made of metal, the side wall frame reinforcing the side wall main body,
   wherein a set of the tail lamp and the side wall main body includes a groove portion opening inward in the vehicle width direction,
   wherein the side wall frame includes a rear post portion covering the groove portion from the front, and
   wherein the groove portion and the rear post portion constitute the recessed portion and define the recessed space.

4. The utility vehicle according to claim 2, wherein the side wall main body is formed by blow molding.

5. The utility vehicle according to claim 2,
   wherein the side wall frame includes a bracket projecting rearward from the rear post portion, the bracket being outward of a surface of the rear post portion in the vehicle width direction, the surface of the rear post portion facing inward in the vehicle width direction,
   wherein the tail lamp includes a rear portion including a light source and an inner portion projecting forward from an inner region of the rear portion, the inner region being inward of a center of the rear portion in the vehicle width direction,
   wherein the inner portion of the tail lamp includes the groove portion placed on the bracket from inside in the vehicle width direction,
   wherein the bolt is inserted from inside in the vehicle width direction to secure the groove portion to the bracket, and
   wherein the head portion of the bolt is hidden by the tail lamp when viewed from behind.

6. The utility vehicle according to claim 2,
   wherein the side wall main body includes:
   an accommodation portion recessed from a rear edge surface of the side wall main body to an outer side surface of the side wall main body,
   a bolt hole extending from an inner side surface of the side wall main body toward the accommodation portion, and
   a rib portion located behind the bolt hole and projecting inward from the inner side surface in the vehicle width direction,
   wherein the tail lamp includes a nut facing inward in the vehicle width direction,
   wherein the shaft portion of the bolt is inserted into the bolt hole from inside in the vehicle width direction and threaded into the nut of the tail lamp accommodated in the accommodation portion, and
   wherein the head portion of the bolt is hidden by the rib portion when viewed from behind.

7. The utility vehicle according to claim 6,
   wherein the rib portion extends in a vertical direction, and
   wherein the rib portion includes a groove portion in which the bolt hole is located.

8. The utility vehicle according to claim 7, wherein the groove portion opens forward and inward in the vehicle width direction and is substantially C-shaped when viewed from inside in the vehicle width direction.

* * * * *